(12) United States Patent
Michels et al.

(10) Patent No.: US 8,511,905 B2
(45) Date of Patent: Aug. 20, 2013

(54) PRINTING PRESS

(75) Inventors: Jürgen Michels, Dossenheim (DE); Roland Müller, Heβheim (DE); Dieter Schaffrath, Lorsch (DE); Wolfgang Schönberger, Schriesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 481 days.

(21) Appl. No.: 12/575,870

(22) Filed: Oct. 8, 2009

(65) Prior Publication Data

US 2010/0083857 A1 Apr. 8, 2010

(30) Foreign Application Priority Data

Oct. 8, 2008 (DE) .......................... 10 2008 050 830

(51) Int. Cl.
*F16C 43/04* (2006.01)
*B41L 5/16* (2006.01)

(52) U.S. Cl.
USPC ............................. 384/585; 384/456; 101/480

(58) Field of Classification Search
USPC ................. 384/445, 456, 495, 510, 535, 537, 384/541, 548, 556–559, 581, 583–585; 101/216, 407.1, 480; 492/15, 47
See application file for complete search history.

(56) References Cited

U.S. PATENT DOCUMENTS

| | | | | |
|---|---|---|---|---|
| 2,556,317 A * | 6/1951 | Cook | ............................ | 384/535 |
| 2,702,634 A * | 2/1955 | Roubal | ........................ | 384/428 |
| 3,873,103 A * | 3/1975 | Derner | ........................... | 384/138 |
| 4,318,574 A * | 3/1982 | Nakamura | ..................... | 384/564 |
| 4,398,774 A | 8/1983 | Voll et al. | | |
| 5,066,147 A * | 11/1991 | Brandenstein et al. | ........ | 384/585 |
| 5,259,307 A * | 11/1993 | Bourgeois et al. | ............ | 101/118 |
| 6,715,925 B2 * | 4/2004 | Pairone et al. | ................. | 384/536 |
| 7,389,728 B2 | 6/2008 | Hieronymus et al. | | |

FOREIGN PATENT DOCUMENTS

| | | |
|---|---|---|
| DE | 1 961 548 U1 | 6/1967 |
| DE | 30 34 651 A1 | 4/1982 |
| DE | 80 26 751 U1 | 6/1982 |
| DE | 101 52 467 A1 | 5/2002 |
| DE | 10 2005 049 176 A1 | 5/2006 |

OTHER PUBLICATIONS

Machine Translation of DE 1961548 obtained on Mar. 26, 2012.*
German Patent and Trademark Office Search Report, dated Mar. 11, 2009.

* cited by examiner

*Primary Examiner* — James Pilkington
(74) *Attorney, Agent, or Firm* — Laurence A. Greenberg; Werner H. Stemer; Ralph E. Locher (57) ABSTRACT

A printing press includes a roller having a first antifriction bearing and a second antifriction bearing. The first antifriction bearing has rolling bodies, a first ring and a second ring. One of the two rings forms an outer ring and the other of the two rings forms an inner ring. Roller sockets are configured as quick action changing devices for receiving the anti-friction bearings during insertion of the roller into the printing press. The first antifriction bearing is configured as an axial floating bearing with a considerable axial movement play of the rolling bodies between the latter and one of the rings. The second antifriction bearing is configured as an axial locating bearing without such a considerable axial movement play. A centering device centers one of the rings relative to the other.

10 Claims, 5 Drawing Sheets

PRINTING PRESS

CROSS-REFERENCE TO RELATED APPLICATION

This application claims the priority, under 35 U.S.C. §119, of German Patent Application DE 10 2008 050 830.6, filed Oct. 8, 2008; the prior application is herewith incorporated by reference in its entirety.

BACKGROUND OF THE INVENTION

Field of the Invention

The present invention relates to a printing press including a roller having antifriction bearings and roller sockets configured as quick action changing devices for receiving the antifriction bearings during insertion of the roller into the printing press.

German Published, Non-Prosecuted Patent Application DE 10 2005 049 176 A1, corresponding to U.S. Pat. No. 7,389,728, describes a printing press, in which a roller is mounted in roller sockets configured as quick action changing devices or quick action closures, as a result of which, for example for the purpose of cleaning it, the roller can be removed rapidly from the roller sockets and the printing press by the operator of the printing press and can be inserted into them again. The roller sockets each have a clamping eccentric for radially securing the roller in the respective roller socket. The clamping eccentric is mounted rotatably in the roller socket and is rotated by the operator through the use of a socket wrench into a rotary position for securing. In that rotary position, the clamping eccentric presses an antifriction bearing against two stops of the roller socket, as a result of which the antifriction bearing is clamped between the clamping eccentric and the stops, as in a three-point bearing. In that case, the clamping eccentric presses onto an outer ring of the antifriction bearing and an inner ring of the antifriction bearing is seated fixedly on an axle journal of the roller. The roller has a cavity and is connected to a temperature control liquid circuit when the roller is inserted into the roller sockets. A temperature control liquid which circulates in the temperature control liquid circuit is pumped into the cavity of the roller, in order to control the temperature of the latter.

The temperature control necessarily has the consequence of a change in the length of the roller. Thermally induced axial stresses and, as a consequence, high bearing loading, are associated with the change in length. The high bearing loading results in turn in high abrasion wear of the antifriction bearings and high operation-induced development of heat in the antifriction bearings, as a result of which their service life is reduced.

German Published, Non-Prosecuted Patent Application DE 30 34 651 A1, corresponding to U.S. Pat. No. 4,398,774, describes a floating bearing for shafts. The floating bearing has the effect of compensating for temperature expansion, in order to increase the service life of the antifriction bearings. In that floating bearing, there is an axially clamped antifriction bearing. A bearing plate, which is disposed between the outer ring of the antifriction bearing and a housing, at least includes thin-walled, radially and axially directed sections which form a metal diaphragm with an approximately O-shaped cross section. An axial displacement of the floating bearing, which is desirable in many applications as a consequence of thermal expansion, is therefore possible.

German Utility Model DE 80 26 751 U1 describes a bearing of a rotatable machine part, in which one antifriction bearing ring is clamped-in fixedly and another antifriction bearing ring is likewise clamped-in fixedly in a supporting bushing which is supported radially by an axially prestressed diaphragm that is sprung in the axial direction. Furthermore, that document states that cylindrical roller bearings belong to so-called rigid antifriction bearings which in themselves do not permit an axial relative movement between the inner ring and the outer ring.

The bearings which are described in the last two cited documents (German Published, Non-Prosecuted Patent Application DE 30 34 651 A1, corresponding to U.S. Pat. No. 4,398,774, and German Utility Model DE 80 26 751 U1) are little suited for use in the printing press which is described in the document which was cited first (German Published, Non-Prosecuted Patent Application DE 10 2005 049 176 A1, corresponding to U.S. Pat. No. 7,389,728).

SUMMARY OF THE INVENTION

It is accordingly an object of the invention to provide a printing press, which overcomes the hereinafore-mentioned disadvantages of the heretofore-known devices of this general type and in which the service life of antifriction bearings therein is increased.

With the foregoing and other objects in view there is provided, in accordance with the invention, a printing press, comprising a roller having a first antifriction bearing and a second antifriction bearing. The first antifriction bearing has rolling bodies, a first ring and a second ring. One of the two rings forms an outer ring and the other of the two rings forms an inner ring. Furthermore, the printing press according to the invention includes roller sockets which are configured as quick action changing devices for receiving the antifriction bearings during insertion of the roller into the printing press. The printing press according to the invention is distinguished by the fact that the first antifriction bearing is configured as an axial floating bearing with a considerable axial movement play of the rolling bodies between the latter and one of the two rings, by the fact that the second antifriction bearing is configured as an axial locating bearing without a considerable axial movement play of this type, and by virtue of the fact that there is a centering device for centering one of the two rings relative to the other of the two rings.

In this context, centering is understood as meaning that a rolling body running face of one ring is displaced relative to a rolling body running face of the other ring into an aligned position, in which the two antifriction bearing running faces lie substantially on one and the same radial alignment line. Furthermore, in the present context, the considerable axial movement play is understood as meaning a movement play which is substantially greater than the movement play that is induced by manufacturing tolerances and is required for the rotation of the rolling bodies.

An axial compensation movement of the ring which is to be centered relative to the other ring is advantageously made possible by the axial movement play. Thermally induced axial stresses in the antifriction bearings are avoided by this axial compensation movement. Such thermally induced axial stresses would otherwise lead to high bearing loading and, as a consequence, to a reduced bearing service life. Thermally induced axial expansion and contraction of the roller is compensated for by the configuration of the first antifriction bearing and the presence of the centering device, with the result that such changes in length are innocuous.

In accordance with another feature of the invention, the second antifriction bearing has a negligible axial movement play which is smaller than the considerable axial movement play of the first antifriction bearing. The negligible axial movement play can be a movement play which is induced by manufacturing tolerances and a movement play which is required for the rotation of the rolling bodies.

In accordance with a further feature of the invention, the considerable axial movement play is between the rolling bodies and the second ring, with the result that the rolling bodies can be displaced axially relative to the second ring, and accordingly the rolling body running face of the second ring is substantially longer than the axial length of the rolling bodies in the axial direction, that is to say as viewed in the direction which is parallel to the geometrical rotational axis of the first antifriction bearing.

In accordance with an added feature of the invention, the centering device is configured for centering the first ring together with the rolling bodies relative to the second ring. In this case, the rolling body running face of the first ring is substantially exactly as long as the axial length of the rolling bodies as viewed in the axial direction. The rolling bodies can be guided comparatively tightly between two projecting shoulders of the first ring. The shoulders delimit the rolling body running face toward both sides. As a result, the rolling bodies are as it were clamped-in axially in the first ring. As a consequence of this, during each axial displacement of the first ring relative to the second ring, the rolling bodies which are seated tightly in the first ring are driven by the first ring and are displaced axially relative to the second ring.

In accordance with an additional feature of the invention, the first antifriction bearing is configured without a considerable movement play between the rolling bodies and the first ring. This means the above-mentioned axial quasi clamping of the rolling bodies in the first ring. However, that clamping is not so tight that it impedes the necessary rotation of the rolling bodies. The movement play which is present between the rolling body and the first ring is just great enough to permit an easy running rotation of the rolling bodies.

In accordance with yet another feature of the invention, there is a negligible axial movement play between the rolling bodies and the first ring. That axial movement play is substantially smaller than the considerable axial movement play. Accordingly, the axial movement play which is present between the rolling bodies and the first ring is substantially smaller than the axial movement play which is present between the rolling bodies and the second ring.

In accordance with yet a further feature of the invention, the first ring forms the outer ring and the second ring forms the inner ring.

In accordance with yet an added feature of the invention, the centering device has at least one centering element which has a substantially wedge-shaped or V-shaped profile. A wedge-shaped or V-shaped engagement profile of the centering element can have a convex (outer wedge) or concave (inner wedge) configuration. Flanks of the V-shape do not have to extend ideally rectilinearly in every case and can be rounded somewhat, which results in a type of U-shape. The centering device can also have a further centering element, with one centering element engaging into the other centering element during centering.

In accordance with yet an additional feature of the invention, the centering element is formed on the outer ring. The centering element can be formed on that outer face of the outer ring on the circumferential side and can be, for example, a ring which projects from the circumferential face and forms an elevation which extends on the outer circumferential face in the circumferential direction.

In accordance with again another feature of the invention, the centering element is an annular groove. The annular groove can be made in the outer circumferential face of the outer ring and can be, as it were, the inverse formation of the above-mentioned ring which projects from the outer circumferential face.

In accordance with again a further feature of the invention, the centering element is formed on that one of the roller sockets which receives the first antifriction bearing. There can also be a further centering element in this embodiment, in which the further centering element is formed on the outer ring, with the result that in each case one centering element is formed on the outer ring and on the roller socket and the two centering elements come into contact with one another during centering.

In accordance with again an added feature of the invention, the centering element is formed on a clamping element for clamping the first antifriction bearing into the roller socket. The clamping element is mounted adjustably in such a way that the clamping element can be moved toward the first antifriction bearing during clamping-in of the latter and can be moved away from the first antifriction bearing during unclamping. The movement of the clamping element takes place substantially radially with regard to the first antifriction bearing. In other words, the movement takes place either in the radial direction or has a sufficiently large movement component in the radial direction. The clamping element can be, for example, a clamping slide. In the clamped state, the first antifriction bearing can be clamped in the manner of a three-point bearing between two abutment faces and the clamping element which acts in this case as a type of clamping element or pressure piece.

In accordance with again an additional feature of the invention, the clamping element is a clamping lever. The clamping lever can be pivoted about a joint which is disposed eccentrically relative to the geometrical rotational axis of the first antifriction bearing when the first antifriction bearing is clamped in its operating position in the roller socket.

In accordance with a concomitant feature of the invention, the centering element, which is formed on the roller socket, can be a centering groove and therefore a concavely profiled centering element or a lug and thus a convexly profiled centering element.

Other features which are considered as characteristic for the invention are set forth in the appended claims.

Although the invention is illustrated and described herein as embodied in a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
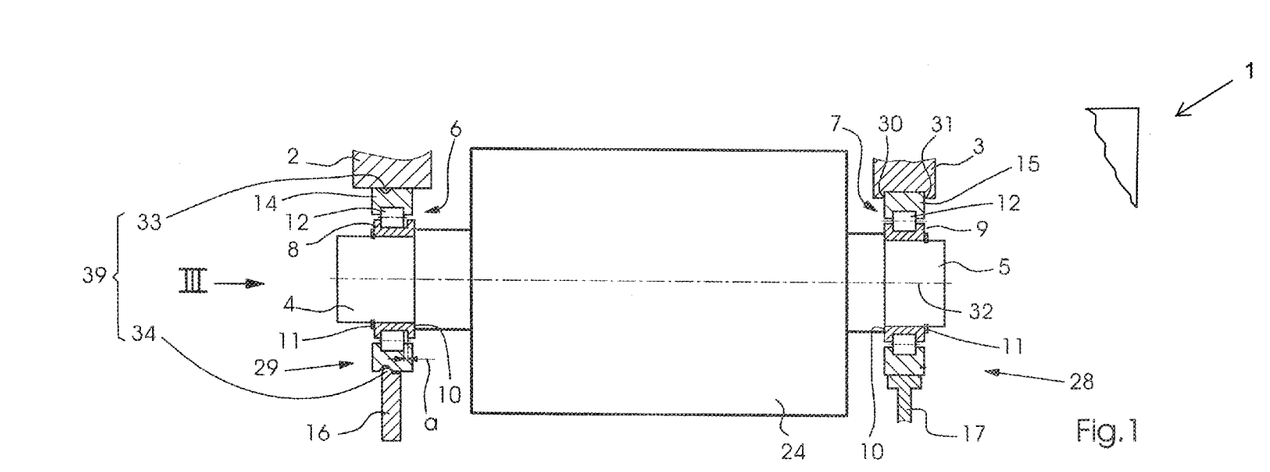
FIG. 1 is a fragmentary, diagrammatic, partly-sectional plan view of a printing press roller which has already been inserted loosely into roller sockets but has not been clamped in yet, in which one antifriction bearing of the roller is unaligned.
Figure 2:
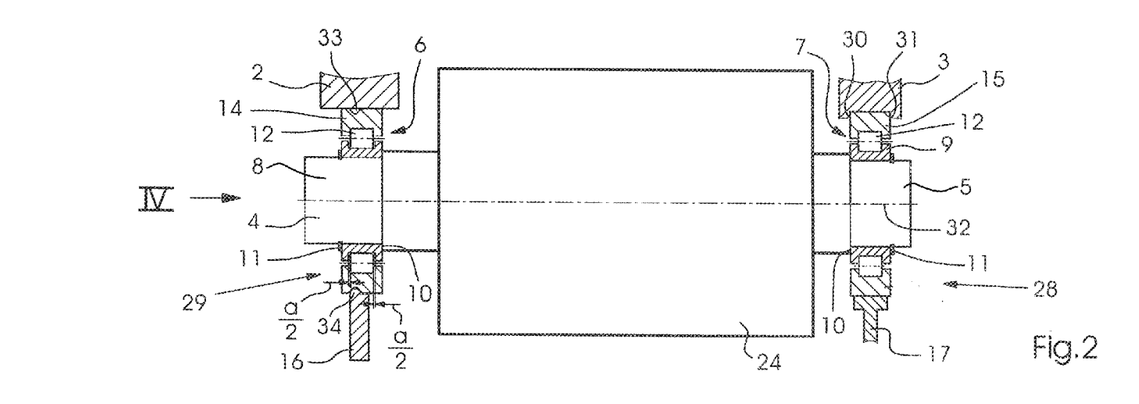
FIG. 2 is a view of the roller similar to FIG. 1, in a state in which it is clamped into the roller sockets and the antifriction bearing is aligned.

Referring now in detail to FIGS. 1 to 10 of the drawings, in which components and elements that correspond to one another are denoted by the same designations, and first, particularly, to FIGS. 1 and 2 thereof, there is seen a portion of a printing press 1. The printing press is a lithographic offset printing press for printing sheets and has anilox printing units for four color printing. Each anilox printing unit includes a roller 24 which is configured as an engraved roller. The roller 24 is a hollow roller, through which a temperature control liquid flows. It is not shown in the drawing that a doctor-type ink fountain bears against the roller 24 during printing operation, in order to feed the ink to the roller 24. The fragmentary view shows the roller 24 together with its mounting.

A roller socket 2 on the drive side of the printing press 1 and a roller socket 3 on the operating side belong to the mounting. The drive side is that machine side, on which a gear mechanism is situated, through which the rotation of the roller 24 is form-lockingly driven. A form-locking connection is one which connects two elements together due to the shape of the elements themselves, as opposed to a force-locking connection, which locks the elements together by force external to the elements. The gear mechanism is connected in drive terms to the roller 24 through a coupling. The coupling is releasable, in order for it to be possible to remove the roller 24 from the printing press 1 and to replace it with a roller 24 with a different engraved pattern, for example an engraved pattern which receives more ink. The coupling includes two coupling halves, of which one is disposed on an axle journal 4 of the roller 24. That axle journal 4 lies on the drive side. The gear mechanism and the coupling have been omitted from the drawing for reasons of improved clarity. The roller sockets 2, 3 are configured as quick action changing devices. A first antifriction or roller bearing 6 is seated on the drive-side axle journal 4 and a second antifriction or roller bearing 7 is seated on an operating-side axle journal 5. The antifriction bearings 6, 7 are maintenance-free antifriction bearings, are provided with a lubricant grease filling which is sufficient over the entire bearing service life, and are sealed. The antifriction bearings 6, 7 are cylindrical roller bearings and each include an inner ring 8, 9 which is seated fixedly on a respective axle journal 4, 5 and is secured against axial displacement in both directions by a step 10 and a securing ring 11. Furthermore, each antifriction bearing 6, 7 includes a row of rolling bodies 12 (cylindrical rollers in this case) and a circumferential cage 13 (see FIG. 3) which keeps the rolling bodies 12 at a spacing from one another. Moreover, each antifriction bearing 6, 7 includes a respective outer ring 14, which can be clamped into the respective roller socket 2, 3 by a movable clamping element in the form of a clamping lever 16, 17, in order to fix the roller 24 radially in its operating position.

Figure 3:
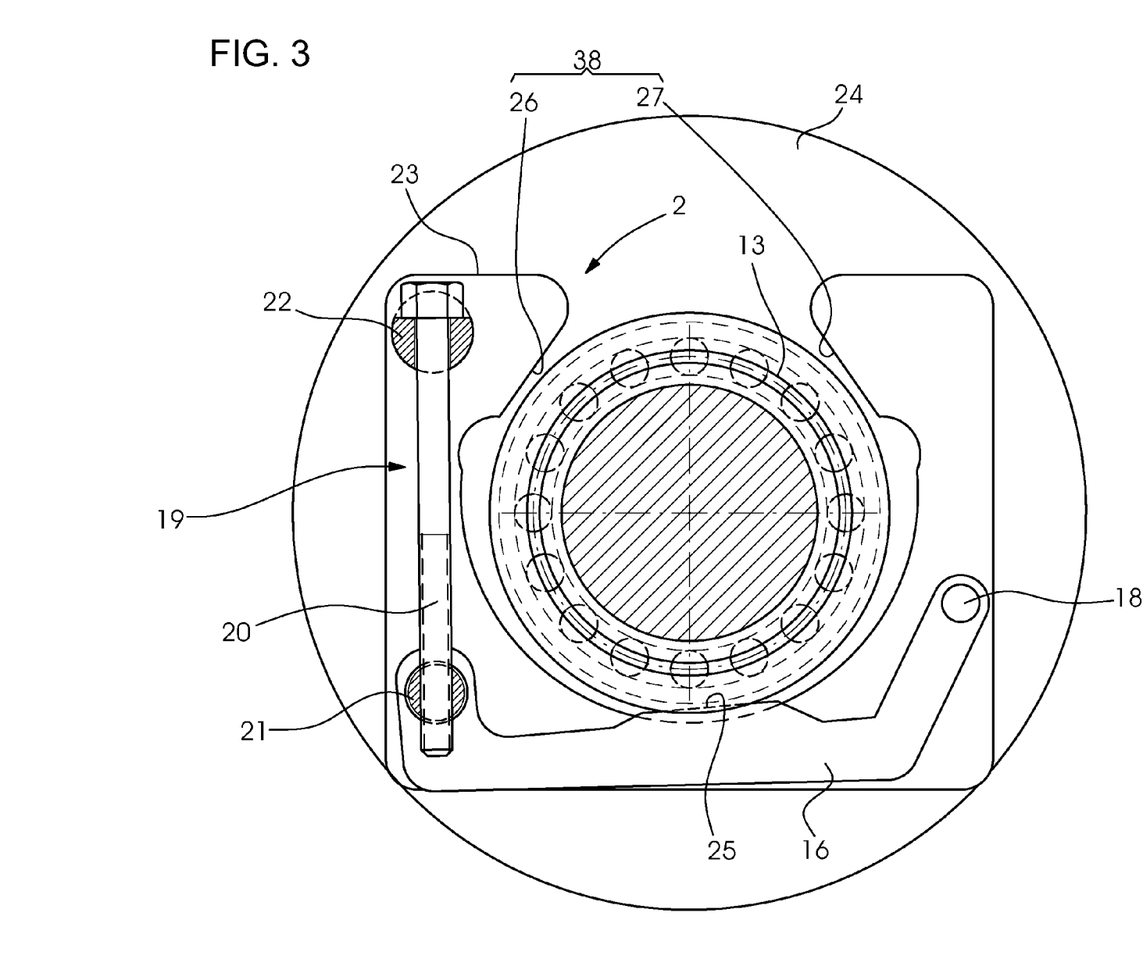
FIG. 3 is a side-elevational view corresponding to a viewing direction III indicated in FIG. 1, in which the roller and the roller socket are shown enlarged.
Figure 4:
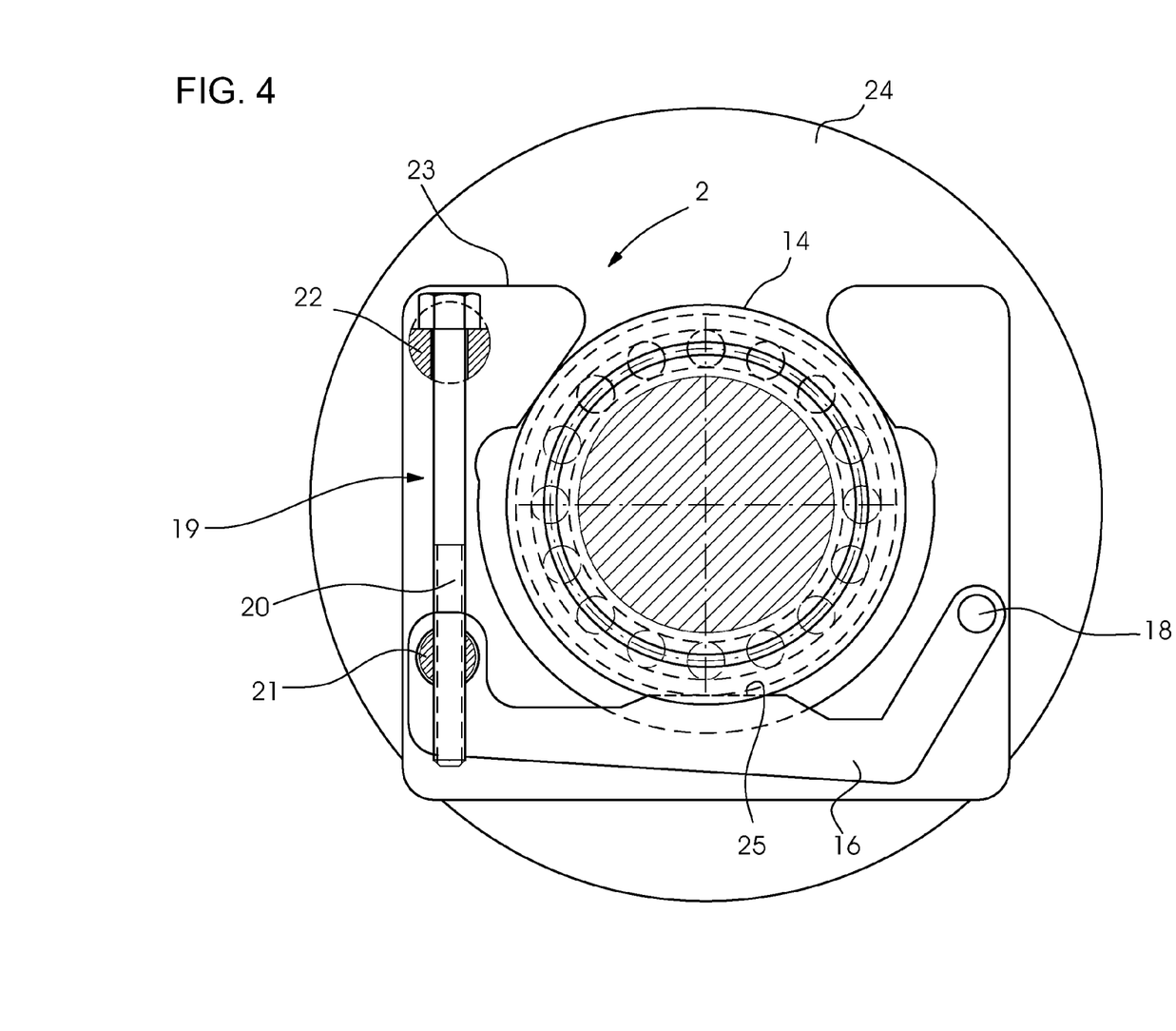
FIG. 4 is a side-elevational view which is likewise enlarged and corresponds to a viewing direction IV indicated in FIG. 2.

FIGS. 3 and 4 show the clamping using the example of the drive-side roller socket 2. The clamping lever 16 is mounted pivotably in a rotary joint 18. Pivoting movements of the clamping lever 16, which take place during clamping of the antifriction bearing 6 toward the latter and during unclamping of the antifriction bearing 6 away from the latter are driven by a screw mechanism 19. The screw mechanism 19 includes a screw 20 and a nut 21. The nut 21 is configured as a pin which is seated rotatably in that end of the clamping lever 16 which is remote from the rotary joint 18 and has a transverse hole with an internal thread, into which the screw 20 is screwed. The screw 20 is plugged loosely through the transverse hole of a pin 22 which is mounted rotatably in a basic body 23 of the roller socket 2. Between the rotary joint 18 and the point of action of the actuating force (that is that lever end which has the nut 21), the clamping lever 16 has a projecting contact face 25 which forms a three-point bearing 38 for the antifriction bearing 6 together with contact faces 26, 27 which are formed on the basic body 23. When the screw 20 has been tightened by the operator, as can be seen in FIG. 4, the clamping lever 16 presses with a force onto the outer ring 14. The force acts on a radial force action line which extends through the contact face 25 of the clamping lever 16 and runs through between the contact faces 26, 27 of the basic body 23. The contact face 25 of the clamping lever 16 therefore presses the outer ring 14 against the other two contact faces 26, 27. As a result, the outer ring 14 is clamped-in radially fixedly between the three contact faces 25, 26, 27 and in such a way as to bear only against the latter. The clamping lever 16 is disposed below the antifriction bearing 6 and therefore raises the roller 24 when the clamping lever is adjusted upward during the clamping.

Radial clamping-in has been explained previously using the example of the first antifriction bearing 6 and the drive-side roller socket 2. Those explanations are also valid by extent for the second antifriction bearing 7, which is functionally identical with regard to the radial clamping, and for the operating-side roller socket 3.

However, there are differences between the first antifriction bearing 6 and the second antifriction bearing 7 and between the two roller sockets 2, 3, which differences relate to the axial method of operation and will be explained in the following text.

The mounting of the roller 24 is configured on one machine side (the operating side) as an axial locating bearing 28 and on the other machine side (the drive side) as an axial floating bearing 29. In the locating bearing 28, a groove which has two flanks 30, 31 is made in the basic body of the roller socket 3. The outer ring 15 of the second antifriction bearing 7 is seated with an accurate fit between the flanks 30, 31. As a result, the outer ring 15 is secured against displacement in both axial directions. The contact face 25, with which the clamping lever presses onto the outer ring 15, has no groove and extends rectilinearly in the axial direction, that is to say in the direction which is parallel to the rotational axis 32 of the roller 24. In the floating bearing 29, an annular groove 33 is formed in the outer circumferential face of the outer ring 14 of the first antifriction bearing 6. The annular groove 33 has a profile which tapers in a substantially V-shaped or wedge-shaped manner toward the groove bottom and has inclined flanks. In the region of its contact face 25 (see FIG. 3), the clamping lever 16 has a projection or a lug 34 with a substantially wedge-shaped profile. The lug 34 engages into the annular groove 33 of the first antifriction bearing 6 during clamping of the latter. On its inner circumferential face, the outer ring 14 has a further annular groove, the flanks of which secure the rolling bodies 12 practically without play against axial displacement and the groove bottom of which forms a running face for the rolling bodies 12. An annular groove of this type, which has an accurate fit with the rolling body 12, is also situated in each case in the inner circumferential face of the outer ring 15 and the outer circumferential face of the inner ring 9 of the second antifriction bearing 7. In contrast, an annular groove is situated in the outer circumferential face of the inner ring 8 of the first antifriction bearing 6. The flanks of that annular groove are spaced further apart from one another by a considerable movement play or magnitude a than the length of the rolling bodies 12. In other words, the running face which is formed by the groove bottom of the annular groove is longer than the rolling bodies 12 by the amount a, as viewed in the axial direction. There is therefore a movement play, which corresponds to the amount a, for the rolling bodies 12 between the rolling bodies 12 and the flanks of the annular groove. The amount a can, for example, be 2 millimeters. The rolling bodies 12 are axially displaceable in the inner ring 8, with the result that the inner ring 8 is axially displaceable relative to the rolling bodies 12 in the case of thermally induced changes in length. Stresses are avoided by this displaceability when the length of the roller 24 changes in a thermally induced manner. The roller 24 is selectively controlled to different temperatures through the above-mentioned temperature control liquid, in order to control the ink quantity which is delivered from the roller 24 to another roller. The advantages of the invention are effective, in particular, in a large format printing press, in which the initial length of the roller 24 is great and the thermally induced change in length is correspondingly great. As a consequence of the change in length of the roller 24 including its axle journals 4, 5, the axial position of the inner ring 8, which is seated on the axle journal 4, changes relative to the outer ring 14 and the rolling bodies 12. Since the change in length can be an increase in length and a decrease in length depending on whether the temperature change of the roller 24 which is the cause for this is a temperature increase or a temperature decrease, it is advantageous that there is in each case a sufficient play between the flanks of the annular groove of the inner ring 8 and the flat faces of the rolling bodies 12 in both axial directions, that is to say to the left and to the right with regard to FIGS. 1 and 2. The play is half of the amount a in the case of a mean operating temperature of the roller 24 and is therefore approximately 1 millimeter in the given example. In order to ensure this substantially symmetrical movement play distribution, the lug 34 engages as a centering element into the outer side annular groove 33 of the outer ring 14 during closing of the roller socket 2 and tightening of the clamping lever 16.

If, in this case, the outer ring 14 is not yet situated in its axial center position which is aligned with the inner ring 8, the lug 34 presses only onto one of the flanks of the annular groove 33, in order to press or displace the outer ring 14 together with the rolling bodies 12 in the direction of the flank. It can be seen in FIG. 1 that the lug 34 presses onto the right-hand flank of the annular groove 33 because the outer ring 14 and the rolling bodies 12 which are seated in it assume an eccentric position which is displaced to the left, before the clamping lever 16 is tightened completely. In this situation, the outer ring 14 does not yet bear against the contact faces 26, 27 (see FIG. 3) of the basic body 23, with the result that unimpeded axial displacement of the outer ring 14 is possible. In the course of the upward pivoting of the clamping lever 16, the latter absorbs the weight of the roller 24 proportionately, as a result of which the outer ring 14 slides along the lug 34 and is aligned centrally or centered by the wedge action. It can be seen in FIG. 2 that the lug 34 bears against both flanks of the annular groove 33 after the complete closure of the roller socket 2, with the result that the outer ring 14 and, with it, the rolling bodies 12 are held in their central position relative to the inner ring 8. The lug 34, together with the annular groove 33, forms an aligning or centering device 39 for the axial alignment or centering of one bearing ring relative to the other.

One advantage of the exemplary embodiment which is shown in FIGS. 1 to 4 can be seen in the fact that the roller socket is closed and the antifriction bearing of the floating bearing is clamped-in and the outer ring of the antifriction bearing is aligned or centered in one and the same work step.

Figure 5:
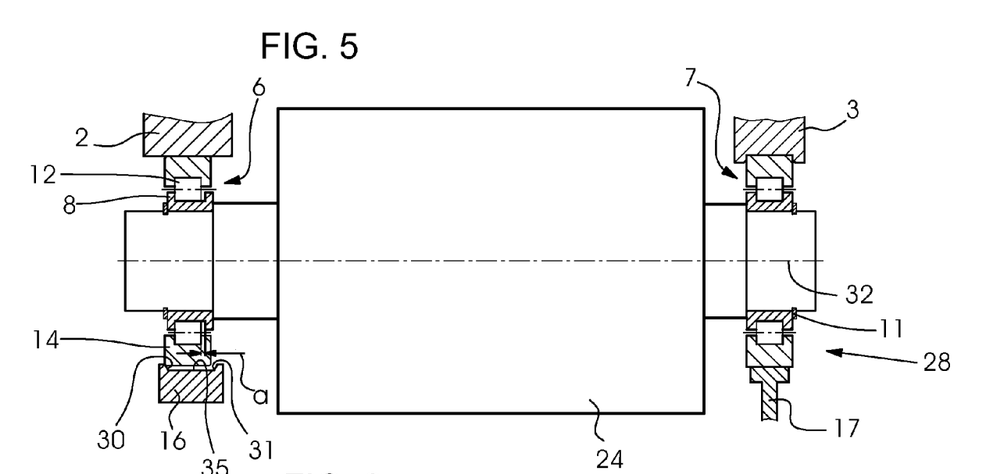
FIG. 5 is a fragmentary, partly-sectional plan view of a modification of the roller socket of FIGS. 1 to 4 in an illustration which is analogous to FIG. 1 and in which a floating bearing is still uncentered.
Figure 6:
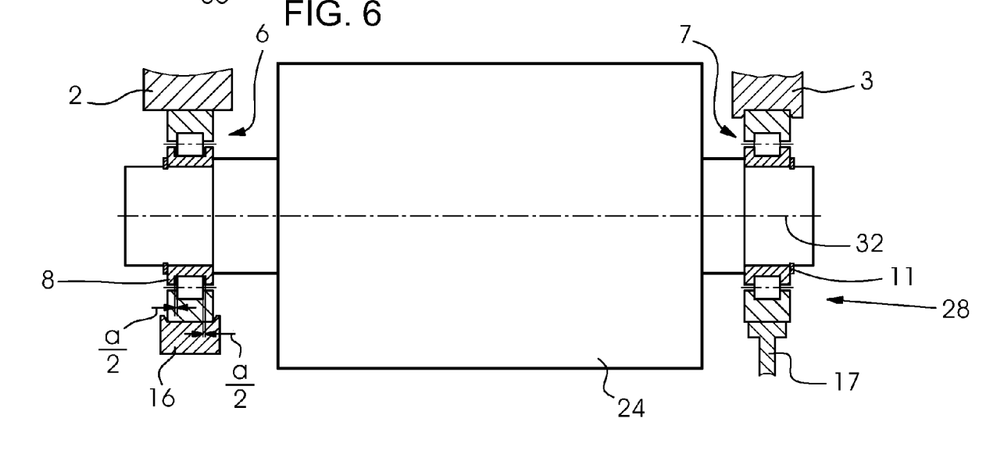
FIG. 6 is a view of the roller modification of FIG. 5, in an illustration which is analogous to FIG. 2 and in which the floating bearing is centered.

FIGS. 5 and 6 show an exemplary embodiment which is a modification of that shown in FIGS. 1 to 4 and differs therefrom only with regard to the centering profilings on the clamping lever 16 and on the outer ring 14. In the exemplary embodiment according to FIGS. 5 and 6, the annular groove 33 and the lug 34 have been omitted and, instead, the clamping lever 16 is provided with a centering groove 35 in the region of its contact face 25 (see FIG. 3). The centering groove 35 has a groove bottom which is substantially as wide as the outer ring 14, with the result that the outer ring 14 of the antifriction bearing 6 (see FIG. 6), which is clamped into the roller socket 2, is seated with an accurate fit in the centering groove 35 without an axial movement play. Moreover, the centering groove 35 has lateral flanks 30, 31 which run toward one another toward the groove bottom. During adjustment of the clamping lever 16 into its clamped position, the outer ring 16 slides along the flank 30 of the centering groove 35 under the action of the roller weight. The outer ring 14, which has not yet been centered, bears against the flank 30. According to FIG. 5, the outer ring 14 bears with one of its edges against the left-hand flank 30 of the centering groove 35, while it slides along the left-hand flank 30 during raising of the roller 24 through the use of the clamping lever 16. In this case, the outer ring 14 moves deeper and deeper into the centering groove 35 and at the same time to the right, until the outer ring 14 has assumed its position which is centered relative to the clamping lever 16 and therefore the inner ring 8 and is shown in FIG. 6.

Figure 7:
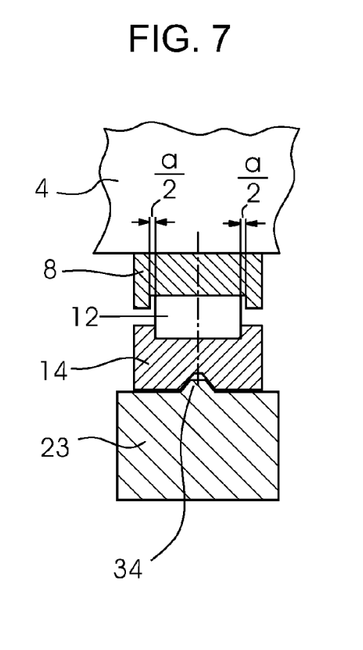
FIG. 7 is a fragmentary, partly-sectional plan view of a further modification of the roller socket of FIGS. 1 to 4, with a centering element being disposed on a basic body of the roller socket, instead of on a clamping lever (FIGS. 1 to 4)
Figure 8:
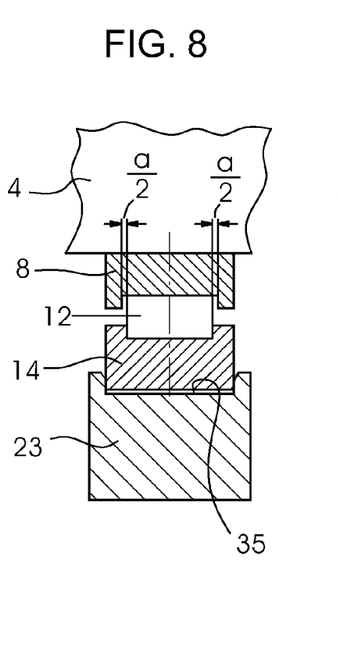
FIG. 8 is a fragmentary, partly-sectional plan view of a modification of the exemplary embodiment of FIG. 7, in which the centering element that is disposed on the basic body is formed as a depression instead of as a projection (FIG. 7)

FIGS. 7 and 8 show exemplary embodiments, in which the movable clamping element (the clamping lever 16) can be dispensed with. In these exemplary embodiments, the centering element or profile, which acts axially on the outer ring 14, is not disposed on the clamping element, but rather on the basic body 23 of the roller socket 2. The exemplary embodiment which is shown in FIG. 7 therefore differs from that shown in FIG. 1 in that, in the former, the lug 34 is disposed on the basic body 23 of the roller socket 2. The exemplary embodiment which is shown in FIG. 8 is a modification of that shown in FIG. 5. The modification differs therefrom in that, in the latter, the centering groove 35 is formed on the basic body 23 and not on the clamping lever 16. The system which is shown in FIG. 7 functions in such a way that, during insertion of the antifriction bearing 6 into the roller socket 2, the annular groove 33, which is made in the outer ring 14, is pushed over the lug 34. If, in this case, the outer ring 14 and the rolling bodies 12 which are seated in it are situated in an axially eccentric position relative to the inner ring, the outer ring 14 is centered together with the rolling bodies 12 automatically under the action of weight.

Analogously to this, in the system which is shown in FIG. 8, the outer ring 14 is likewise centered automatically on the basic body 23 under the action of the pressure of the outer ring 14 on the centering element (in this case, the centering groove 35). The outer ring 14 which, before this centering, is displaced toward one side (for example, away from the barrel of the roller 24) and, as a result, is situated out of alignment relative to the inner ring 8, and the rolling bodies 12 which are displaced with the outer ring 14 toward that side are pushed into alignment with the inner ring 8 by the outer ring 14 sliding into the centering groove 35 along that flank of the latter which lies on that side, and being pushed in the process by this flank into an axial position which is aligned with the inner ring 8.

Figure 9:
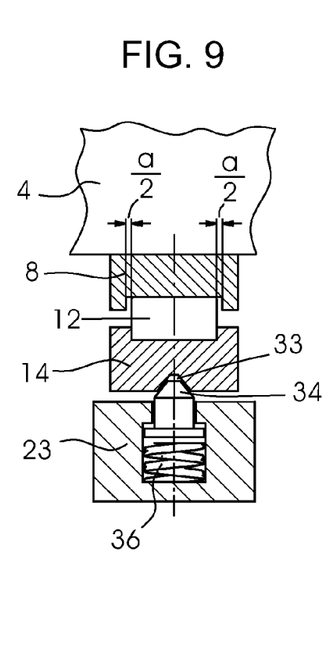
FIG. 9 is a fragmentary, partly-sectional plan view of a further modification of the exemplary embodiment of FIG. 7, in which the centering element is movable relative to the basic body instead of being rigid (FIG. 7)

FIG. 9 shows that the lug 34, which is of rigid configuration in FIG. 7, can be replaced by a lug 34 which is sprung by a spring 36 in the manner of a spring pin and thus forms a sprung pressure piece. The spring 36 therefore loads the displaceably mounted centering element, in this case the lug 34. The lug 34 is pressed toward the outer ring 14 by the spring 36. During insertion of the antifriction bearing 6 into the roller socket 2, the sprung lug 34 snaps into the annular groove 33 of the outer ring 14.

Figure 10:
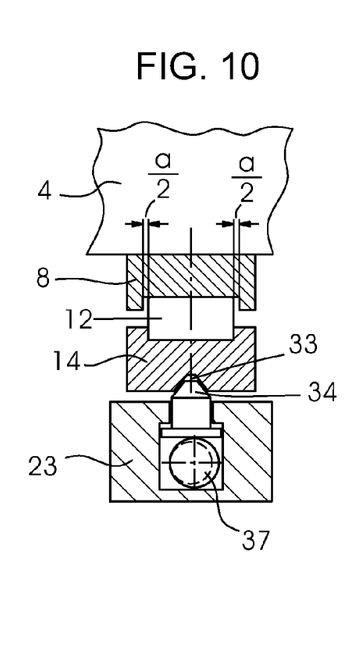
FIG. 10 is a fragmentary, partly-sectional plan view of a modification of the exemplary embodiment of FIG. 9, in which the centering element is adjustable relative to the basic body through an eccentric operating element instead of being sprung (FIG. 9).

FIG. 10 shows that the spring 36 in FIG. 9 has been replaced by an actuating element 37 which can be actuated manually or by motor. As a result of the actuation of the actuating element 37, the centering element on the basic body 23 (in this case, the lug 34) is pushed into deeper centering engagement with its counterpart on the outer ring 14 (the annular groove 33). In the exemplary embodiment which is shown, the actuating element 37 is configured as an eccentric.

The invention claimed is:

1. A printing press, comprising:
    a roller having a first antifriction bearing and a second antifriction bearing;
    said first antifriction bearing having rolling bodies, a first ring and a second ring, one of said rings forming an outer ring and the other of said rings forming an inner ring, said inner ring and said outer ring each having a respective rolling body running face;
    said first antifriction bearing being configured as an axial floating bearing with a considerable axial movement play of said rolling bodies between said rolling bodies and one of said rings;
    said second antifriction bearing being configured as an axial locating bearing with a negligible axial movement play;
    roller sockets configured as quick action changing devices for receiving said first antifriction bearing and said second antifriction bearing during insertion of said roller into the printing press, said roller sockets having a basic body, said basic body having only two contact faces;
    a centering device for centering one of said rings, relative to the other of said rings, said centering device having at least one centering element, said centering element for displacing one said respective rolling body running face relative to another said respective rolling body running face into an aligned position in which said rolling body running faces are aligned on a common radial alignment line; and
    a clamping element for clamping said first antifriction bearing into said one roller socket, said clamping element being a clamping lever having only one contact face;
    said at least one centering element being formed on one of said roller sockets or said clamping element;
    in a clamped position of said clamping element, said one contact face of said clamping lever pressing said outer ring of said first antifriction bearing against said two contact faces of said basic body for holding said outer ring by bearing only against said two contact faces of the basic body and said one contact face of said clamping element.

2. The printing press according to claim 1, wherein said second antifriction bearing has an axial movement play being substantially smaller than said considerable axial movement play of said first antifriction bearing.

3. The printing press according to claim 1, wherein said considerable axial movement play is between said rolling bodies and said second ring, permitting said rolling bodies to be displaced axially relative to said second ring.

4. The printing press according to claim 1, wherein said centering device is configured for centering said first ring together with said rolling bodies relative to said second ring.

5. The printing press according to claim 1, wherein said first antifriction bearing is configured without said considerable movement play between said rolling bodies and said first ring.

6. The printing press according to claim 5, wherein said rolling bodies and said first ring have a negligible axial movement play therebetween that is substantially smaller than said considerable axial movement play.

7. The printing press according to claim 1, wherein said first ring forms said outer ring and said second ring forms said inner ring.

8. The printing press according to claim 1, wherein said at least one centering element is provided with a substantially wedge-shaped or V-shaped profile.

9. The printing press according to claim 8, wherein said at least one centering element is a centering groove.

10. The printing press according to claim 8, wherein said at least one centering element is a lug.

* * * * *